United States Patent [19]

Anderson

[11] Patent Number: 5,078,627
[45] Date of Patent: Jan. 7, 1992

[54] VOLTAGE REGULATOR AND RECTIFIER HAVING OVER-TEMPERATURE PROTECTION

[75] Inventor: Philip A. Anderson, Waukegan, Ill.

[73] Assignee: Outboard Marine Corporation, Waukegan, Ill.

[21] Appl. No.: 451,885

[22] Filed: Dec. 18, 1989

[51] Int. Cl.⁵ ............................................. B63H 21/22
[52] U.S. Cl. ......................................... 440/1; 322/36; 123/198 D; 440/88
[58] Field of Search ................ 440/1, 2, 88, 900, 113; 123/41.15, 198 D, 195 P; 361/20, 102, 103; 322/33-36; 320/29, DIG. 25; 310/54, 52, 68 C

[56] References Cited

U.S. PATENT DOCUMENTS

| | | | |
|---|---|---|---|
| 4,218,998 | 8/1980 | Hill et al. | 123/198 D |
| 4,475,498 | 10/1984 | Hurner | 123/198 D |
| 4,594,631 | 6/1986 | Iwaki | 322/33 |
| 4,629,471 | 12/1986 | Kurihara et al. | 123/198 D |
| 4,648,364 | 3/1987 | Wills | 123/198 D |
| 4,656,973 | 4/1987 | Endres | 123/198 D |
| 4,695,822 | 9/1987 | Furukawa | 123/41.15 |

Primary Examiner—Ed Swinehart
Attorney, Agent, or Firm—Michael, Best & Friedrich

[57] ABSTRACT

A marine propulsion device includes an engine having an alternator for charging a storage battery. A voltage regulator and rectifier is connected in circuit between the alternator and the storage battery and is disposed within a housing in heat exchange relation with cooling liquid disposed in a water jacket of the engine. The regulator and rectifier are driven by the storage battery and a thermostatic switch is disposed in circuit between the battery and the regulator and rectifier for interrupting power thereto when the temperature of the regulator and rectifier exceeds a predetermined limit.

16 Claims, 2 Drawing Sheets

VOLTAGE REGULATOR AND RECTIFIER HAVING OVER-TEMPERATURE PROTECTION

BACKGROUND OF THE INVENTION

This invention relates to marine propulsion devices and more particularly to over-temperature protection for the voltage regulator and rectifier of a marine propulsion device.

Marine propulsion devices generally include an internal combustion engine having a cooling water jacket and an alternator which provides electrical energy and charges a storage battery. A voltage regulator and rectifier is connected in circuit between the alternator and the storage battery for rectifying the alternating charging current and for regulating the applied charging voltage. Such regulator and rectifiers normally include electronic components which can be severely damaged or destroyed if overheated. As a result, such components are normally enclosed in a casing which is in heat exchange relation with the engine cooling water. However, if there is a loss of cooling water or a failure or blockage of the water circulation system, the voltage regulator and rectifier may become damaged or destroyed due to overheating.

SUMMARY OF THE INVENTION

It is an object of the invention to provide means for protecting the voltage regulator and rectifier of an internal combustion engine from damage due to overheating.

A further object of the invention is to provide thermal protection for the voltage regulator and rectifier of a marine propulsion device wherein the protective means does not disable the engine.

A further object of the invention is to interrupt the flow of energizing current to the voltage regulator and rectifier of a marine propulsion device in the event the temperature rises above a preselected value.

These and other objects and advantages of the present invention will become more apparent from the detailed description thereof taken with the accompanying drawings.

In general terms, the invention provides a marine propulsion device including an a propeller shaft adapted to carry a propeller engine, energy storage means, and alternator means coupled to said engine for generating an alternating current. The alternator means is coupled to the energy storage means for charging the same and voltage regulator and rectifier means are connected in circuit between the alternator means and the energy storage means. Thermoresponsive means is coupled to the voltage regulating and rectifying means and is operative to disable the voltage regulator and rectifying means when the ambient temperature thereof exceeds a predetermined value.

DETAILED DESCRIPTION OF THE PREFERRED EMBODIMENT

Figure 1:
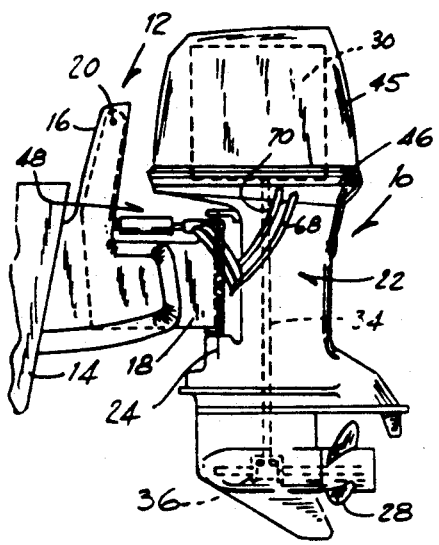
FIG. 1 is a side elevational view of a marine propulsion device embodying the invention.

The marine propulsion device 10 in which the preferred embodiment of the invention may be incorporated is illustrated in FIG. 1. In particular, the device 10 includes a mounting assembly 12 constructed and arranged to be fixedly attached to the transom 14 of a boat. Mounting assembly 12 includes a transom bracket 16 fixedly attached to the transom 14 and a swivel bracket 18 mounted on the transom bracket 16 for pivotal movement of the swivel bracket 18 relative to the transom 14 and about a generally horizontal tilt axis 20. In addition, a propulsion unit 22 is pivotally mounted on the swivel bracket 18 for pivotal movement of the propulsion unit 22 relative to the swivel bracket 18 and about a generally vertical steering axis.

Figure 3:
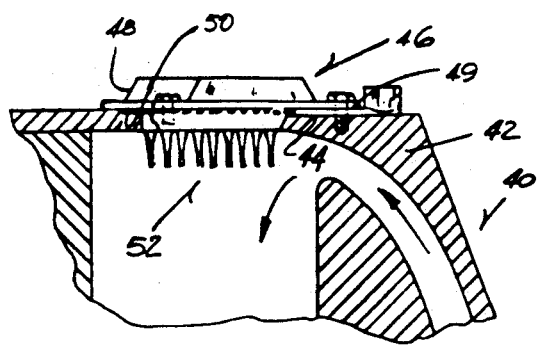
FIG. 3 is a fragmentary, cross-sectional view of the engine shown in FIG. 2.
Figure 2:
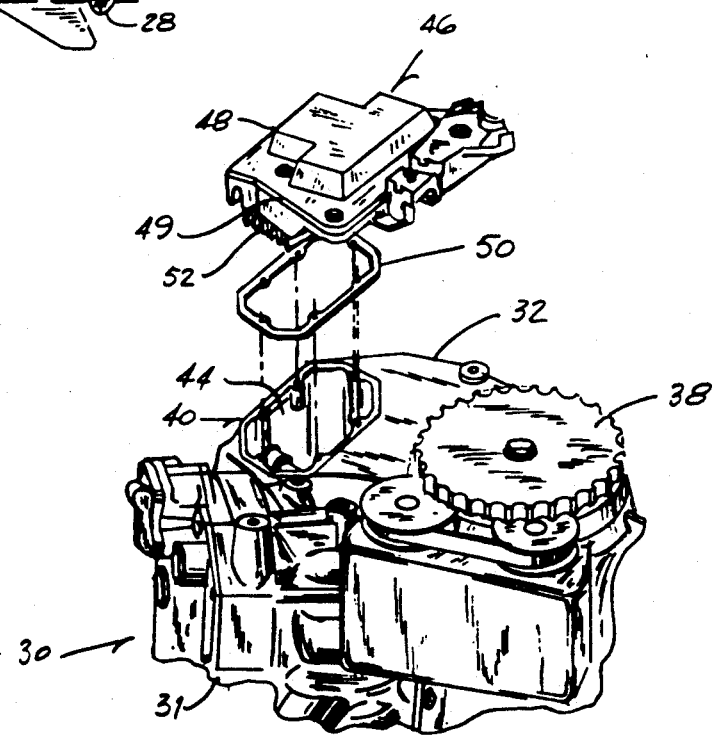
FIG. 2 is an exploded perspective view showing a portion of the engine of the marine propulsion device illustrated in FIG. 1.

The propulsion unit 22 includes a rotatably mounted propeller 28 and an internal combustion engine 30. In the preferred embodiment, as illustrated in FIG. 2, the engine 30 includes an engine block 32 incorporating a pair of cylinder banks 31, one of which is shown. A generally vertically extending crankshaft 34 is rotatably supported by the engine block 32 and has an upper end extending upwardly from the engine block 32 and a lower end drivingly connected to the propeller 28 by a drive train 36. The engine 30 also includes a flywheel 38 mounted on the upper end of the crankshaft 34 and a cooling water jacket 40 (FIG. 3) defined by the engine block 32. In the preferred embodiment, as best seen in FIG. 3, the water jacket 40 is located between the cylinder banks 31 of engine 30 and is partially defined by an upper wall 42 having an opening 44 formed therein.

A voltage regulator and rectifier 46 is disposed in the opening 44 formed in the wall of the engine block and includes electrical circuitry components mounted on a suitable circuit board (not shown) disposed within a housing 48. A lateral flange 49 extends from housing 48 and is suitably fixed in surrounding relation to the opening 44. Those skilled in the art will appreciate that a suitable gasket 50 is preferably disposed between the flange 49 and the engine block 32. In the preferred embodiment, a plurality of cooling fins 52 extend downwardly from the housing 48 and into the cooling liquid circulating in the water jacket 40. In this manner, heat generated by the electrical components within housing 48 can be dissipated.

Figure 4:
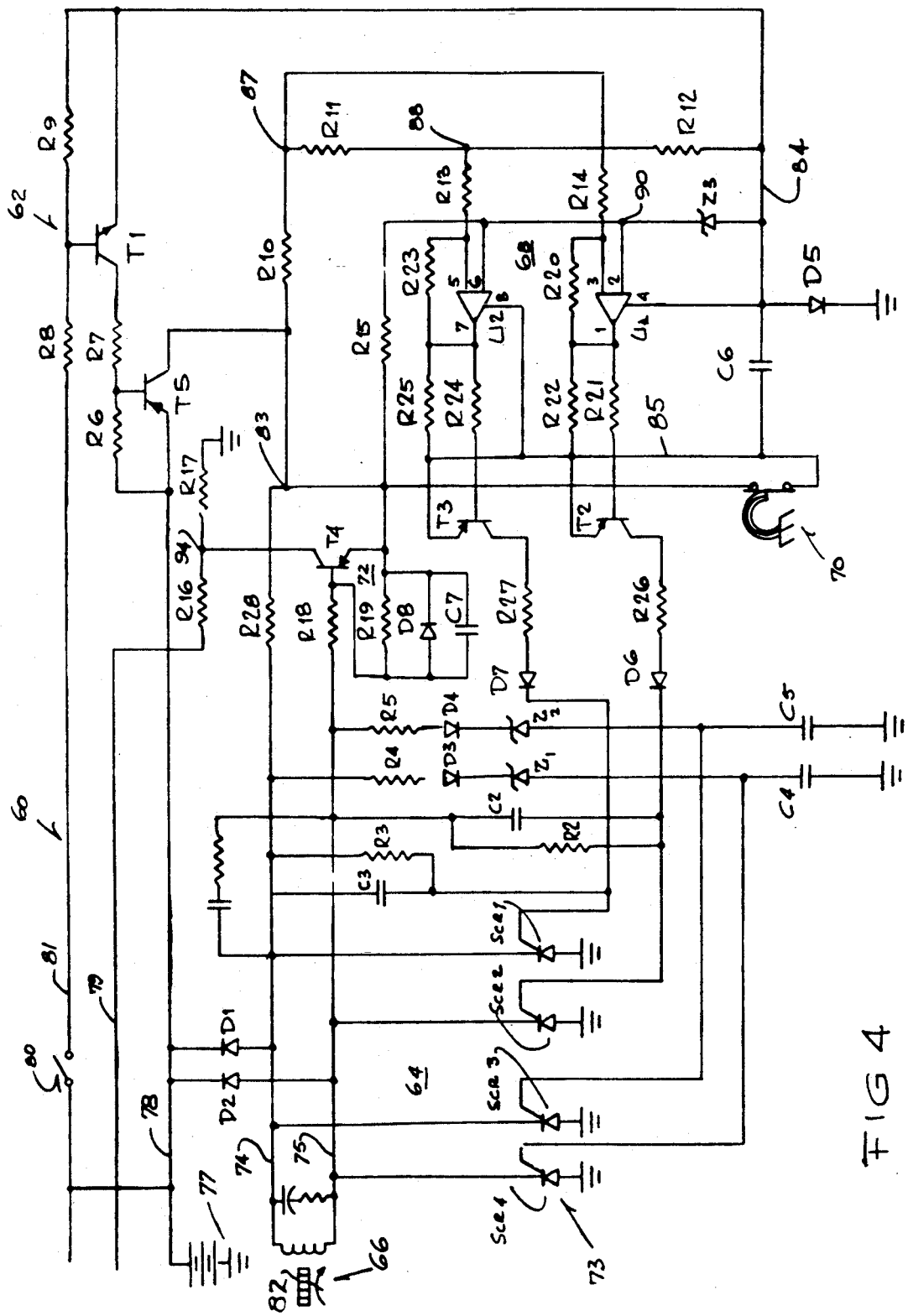
FIG. 4 schematically illustrates a voltage regulator and rectifier for a marine propulsion device incorporating temperature protection means according to the preferred embodiment of the invention.

FIG. 4 shows the voltage regulator and rectifier circuit 60 to include a switching circuit 62 for initiating operation, a rectifying circuit 64 for rectifying the alternating current from an alternator 66, a voltage comparator circuit 68 which compares battery voltage to a reference value, and a temperature responsive switch 70 which interrupts the operation of the voltage regulator and rectifier circuit 62 if the temperature within housing 48 becomes excessive. In addition, a tachometer drive circuit 72 is also shown.

The voltage regulator and rectifier circuit 60 is connected to the stator 73 of alternator 66 by conductors 74 and 75; to the positive terminal of battery 77 by conductor 78; to the tachometer (not shown) by the conductor 79; and to the positive battery terminal 77 by a key switch 80 and a conductor 81.

The rectifier 64 includes a first silicon controlled rectifier SCR1 having its anode connected to ground and its cathode to conductor 74 and a second silicon controlled rectifier SCR2 having its anode connected to ground and its cathode connected to conductor 75. In addition, the rectifier 64 includes a first diode D1 having an anode connected to conductor 74 and a second diode D2 having an anode connected to conductor 75. The cathodes of diodes D1 and D2 are both connected to conductor 78.

Those skilled in the art will apPreciate that alternator 66 includes a rotor 82 coupled to the engine 30 for rotation therewith. This will induce an alternating voltage in the stator coil 73. When both of the silicon controlled rectifiers SCR1 and SCR2 are conductive, full-wave rectification is provided for the alternating current appearing on conductors 74 and 75; when only one of the silicon controlled rectifiers SCR1 or SCR2 is conductive, half-wave rectification is provided; and when neither SCR1 nor SCR2 is conductive, the battery 77 is disconnected from the stator coil 73.

The switching circuit 62 includes a first transistor T1 whose base is connected to conductor 81 through resistor R8 and a resistor R9 is connected between its base and emitter. The collector of transistor T1 is connected through resistor R7 to the gate of a second transistor T5. The emitter of transistor T5 is connected to the conductor 78 and a resistor R6 is connected between its base and emitter. The collector of transistor T5 is connected to terminal 83 which defines one end of a resistor network consisting of resistors R10, R11, and R12 of comparator circuit 68. The other end of resistor R12 is connected to the common 84. Comparator circuit 68 also includes a first operational amplifier U1 and a second operational amplifier U2, both of which operate as comparators. The noninverting terminal of comparator U1 is connected through resistor R14 to the junction 87 between resistors R10 and R11 and the noninverting terminal of comparator U2 is connected through resistor R13 to the junction 88 between resistors R11 and R12. The inverting terminals of comparitors U1 and U2 are each connected to the junction 90 between Zenar diode Z3 and resistor R15. The other terminal of Zenar diode Z3 is connected to common 84 and the other terminal of resistor R15 is connected to terminal 83. Terminal 83 is also connected through resistor R28 to the alternating current input terminal 74. Temperature responsive switch 70 is connected in circuit between terminal 83 and supply conductor of the comparator 68 so that the voltage on terminal 83 will be provided to conductor 85 when the temperature responsive switch 70 is closed, as will be discussed more fully below.

The output of comparator U1 is connected to the base of a first transistor T2 through resistor R21 and the output of the second comparator U2 is connected to the base of a second transistor T3 through resistor R24. In addition, a feedback resistor R20 connects the noninverting terminal of comparator U1 to its output and a pull-up resistor R22 connects the output to conductor 85. Similarly, a feedback resistor R23 connects the noninverting terminal of comparator U2 to its output and a pull-up resistor R25 connects the output to conductor 85.

The emitter of the first transistor T2 is connected to conductor 85 and its collector is connected through resistor R26 and diode D6 to the gate of SCR2. Similarly, the emitter of transistor T3 is connected to conductor 85 and its collector is connected through resistor R27 and diode D7 to the gate of SCR1.

An over voltage protection circuit 73 includes third and fourth silicon controlled rectifiers SCR3 and SCR4, having their anodes respectively connected to conductors 74 and 75 and their cathodes connected to ground. In addition, there is a first network connected between conductor 74 and ground and consisting of resistor R4, diode D3, Zenar diode Z1, and capacitor C4, and a second network connected between conductor 75 and ground and consisting of resistor R5, diode D4, Zenar diode Z2, and capacitor C5. The gate of SCR3 is connected to the junction of capacitor C5 and Zenar diode Z2, and the gate of SCR4 is connected to the junction between Zenar diode Z1 and capacitor C4.

The operation of the regulator and rectifier 60 will now be described. Operation is initiated by closing key switch 80 which connects conductor 81 to the positive battery terminal. This provides a gate signal to transistor T1 which becomes conductive, thereby Providing a gate signal to transistor T5, which in turn becomes conductive to connect terminal 83 to conductor 78. As a result, positive battery voltage appears on conductor 85. This initiates the operation of the comparitors U1 and U2.

The inverting terminal of the first comparator U1 is connected to a fixed voltage set by Zenar diode Z3 and its noninverting terminal is connected to the junction 87 between resistors R10 and R11 to receive a voltage equal to the battery plus voltage less the drop across resistor R10. If the reference voltage at junction 90 exceeds the voltage at junction 87, the output of comparator U1 will go low to turn transistor T2 on. This provides a gate signal to SCR2. Similarly, if the voltage at junction 90 exceeds the voltage at junction 88, the output of comparator U2 will also go low to turn transistor T3 on, thereby Providing a gate signal to SCR1. When both silicon-controlled rectifiers SCR1 and SCR2 are conductive, full-wave rectification is provided between terminals 74 and 75, which are connected to the alternator 66 and the conductor 78, which is connected to the positive battery terminal 77. As a result, a charging current consisting of the full-wave rectified current from alternator 66 will flow to battery 77.

As battery 77 is charged, the voltage at terminals 87 and 88 will rise. It can be seen that the voltage at terminal 87 will be higher than that at terminal 88 by the drop across resistor R11. When the voltage in terminal 87 exceeds the reference voltage on terminal 90, the output of comparator U1 will go high, thereby turning transistor T2 off. This will interrupt the base signal to SCR2, which will cease conducting so that the battery 77 will receive only half-wave rectified charging current from terminals 74 and 75. As the battery 77 charges further, the voltage at terminal 88 will continue to increase until it, too, exceeds the reference voltage in terminal 90. The output of comparator U2 will then go high, turning transistor T3 off and interrupting the gate signal to SCR1. Upon that event, charging current will cease flowing to battery 77.

If an over-voltage occurs at the alternator conductors 74 and 75, the silicon-controlled rectifiers SCR3 and SCR4 will become conductive to ground the conductors 74 and 75 and thereby prevent damage to the battery 77.

In the event of an inordinate rise in the temperature within housing 48, such as would occur if there is a loss of water in the cooling jacket 40, whereby the temperature in the regulator and rectifier 60 exceeds a predetermined limit, temperature responsive switch 70 will open, thereby interrupting the drive to comparitors U1 and U2 and transistors T2 and T3. As a result, the regulator rectifier 60 is shut down. While any suitable temperature switch 70 may be employed, in the preferred embodiment a bimetallic type is used. When the temperature in housing 48 of the regulator and rectifier 60 has been reduced to an acceptable level, temperature responsive switch 70 will close and drive potential will again be provided. Normal engine operating temperature is about 140°–150° F. Switch 70 will normally be set to open at some higher temperature, such as about 200° F., and to reclose at a second temperature, such as about 180° F.

The tachometer drive circuit 72 includes a transistor T4 having an emitter connected to terminal 83 and a collector connected to the junction 94 between resistors R16 and R17, the other ends of which are, respectively, connected to the tachometer (not shown) and ground. The base of transistor T4 is connected to alternator conductor 75 through resistor R18.

It will be appreciated that the frequency of the pulses from alternator 66 will reflect the engine speed. During each half-cycle of the alternator voltage, the base of transistor R4 will go negative relative to its emitter and transistor T4 will conduct until the next half-cycle this will provide voltage pulses on conductor 80 having a frequency proportional to engine speed.

While only a single embodiment of the invention has been illustrated and described, other variations and equivalents will become apparent to those skilled in the art. Accordingly, it is not intended to limit the invention to the disclosed embodiment, but only by the scope of the appended claims.

I claim:

1. A marine propulsion device including an engine, a propeller shaft coupled to the engine and adapted to carry a propeller, energy storage means, alternator means coupled to said engine for generating an alternating current, voltage regulator and rectifier means in circuit between said alternator means and said energy storage means for charging said energy storage means from said alternator means, said voltage regulator and rectifier means including an electronic component subject to damage if operated at an excessive temperature, and thermoresponsive means coupled to said voltage regulator and rectifier means and operative to disable said voltage regulator and rectifier means so as to prevent excessive heating of said electronic component when the ambient temperature thereof exceeds a predetermined value and without interrupting current generation by said alternator.

2. The marine propulsion device set forth in claim 1 wherein said engine has a cooling water jacket, said regulator and rectifier means including a housing means adapted to be in heat exchanging relation with a cooling liquid disposed within said jacket.

3. The marine propulsion device set forth in claim 2 and including switching circuit means coupling said regulator and rectifier means to said energy storage means for providing enabling signals to said voltage regulating and rectifying means, said thermoresponsive means being in circuit between said energy storage means and said voltage regulating and rectifying means for interrupting the flow of enabling signals to said voltage regulating and rectifying means when the ambient temperature exceeds a predetermined value.

4. The marine propulsion device set forth in claim 3 wherein said thermoresponsive means includes a thermostatic switch in circuit with said switching circuit means for interrupting the flow of enabling signals to said voltage regulating and rectifying means when the ambient temperature exceeds a predetermined value.

5. The marine propulsion device set forth in claim 1 and including switching circuit means enabling signals coupling said regulator and rectifier means to said energy storage means for providing operating energy to said voltage regulating and rectifying means, said thermoresponsive means being in circuit between said energy storage means and said voltage regulating and rectifying means for interrupting the flow of enabling signals to said voltage regulating and rectifying means when the ambient temperature exceeds a predetermined value.

6. The marine propulsion device set forth in claim 5 wherein said thermoresponsive means includes a thermostatic switch in circuit with said switching circuit means for interrupting the flow of enabling signals to said voltage regulating and rectifying means when the ambient temperature exceeds a predetermined value.

7. A marine propulsion device including an engine, a propeller shaft coupled to said engine and constructed and arranged to carry a propeller, storage battery means, alternator means coupled to said engine for generating an alternating current, said alternator means being coupled to said storage battery means for charging the same, voltage regulator and rectifier means in circuit between said alternator means and said storage battery means for controlling the flow of charging current to said storage battery means, said voltage regulator and rectifier means including an electronic component subject to damage if operated at an excessive temperature, circuit means coupling said regulator and rectifier means to said storage battery means to provide a driving voltage to said regulator and rectifier means, and thermoresponsive means coupled to said voltage regulator and rectifier means for uncoupling said circuit means from said storage battery means when the ambient temperature of said regulator and rectifier means exceeds a predetermined value so that said regulator and rectifier means is disabled and said electronic component is protected from excessive heat.

8. The marine propulsion device set forth in claim 7 wherein sad engine has a cooling water jacket, said regulator and rectifier means including a housing means adapted to be in heat exchange relation with the cooling liquid disposed within said jacket.

9. The marine propulsion device set forth in claim 8 wherein said thermoresponsive means includes a thermostatic switch in circuit with said circuit means for interrupting the driving voltage to said voltage regulating and rectifying means when the ambient temperature thereof exceeds a predetermined value.

10. A marine propulsion device comprising an engine including water jacket means for cooling said engine, said water jacket means including therein an opening and being adapted to contain a cooling liquid, a propeller shaft coupled to said engine and constructed and arranged to carry a propeller, storage battery means, alternator means coupled to said engine for generating an alternating current, voltage regulator and rectifier means in circuit between said alternator means and said storage battery means for controlling the flow of charging current to said storage battery means, said voltage regulator and rectifier means including electronic components subject to damage if operated at an excessive temperature, circuit means coupling said regulator and rectifier means to said storage battery means whereby said regulator and rectifier means receives a driving voltage, and thermoresponsive means coupled to said voltage regulator and rectifier means and operative to disconnect said circuit means from said storage battery means when the ambient temperature of said regulator and rectifier means exceeds a predetermined value so that said regulator and rectifier means is disabled, said thermoresponsive means including a thermostatic switch in circuit with said circuit means for interrupting the flow of operating energy to said voltage regulator and rectifier means when the ambient temperature thereof exceeds a predetermined value, a housing enclosing said electronic components and said thermostatic switch, said housing being mounted adjacent said opening, and heat exchange means on said housing and extending into said opening and being positioned in heat exchange relation with the cooling liquid in said water jacket means.

11. A marine propulsion device including an engine, a propeller shaft coupled to the engine and adapted to carry a propeller, energy storage means, alternator means coupled to said engine for generating an alternating current, voltage regulator and rectifier means in circuit between said alternator means and said energy storage means for charging said energy storage means from said alternator means, said voltage regulator and rectifier means including an electronic component subject to damage if operated at an excessive temperature, and thermoresponsive means coupled to said voltage regulator and rectifier means for preventing current flow in said voltage regulator and rectifier means so as to prevent excessive heating of said electronic component when the ambient temperature thereof exceeds a predetermined value and without interrupting current generation by said alternator.

12. A marine propulsion device set forth in claim 11 wherein said engine has a cooling water jacket, and wherein said regulator and rectifier means includes a housing means adapted to be in heat exchanging relation with a cooling liquid disposed with said jacket.

13. A marine propulsion device as set forth in claim 12 and including switching circuit means coupling said regulator and rectifier means to said energy storage means for providing enabling signals to said voltage regulator and rectifier means, and wherein said thermoresponsive means is in circuit between said energy storage means and said voltage regulator and rectifier means for interrupting the flow of enabling signals to said voltage regulator and rectifier means when the ambient temperature exceeds a predetermined value.

14. A marine propulsion device as set forth in claim 13 wherein said thermoresponsive means includes a thermostatic switch in circuit with said switching circuit means for interrupting the flow of enabling signals to said voltage regulator and rectifier means when the ambient temperature exceeds a predetermined value.

15. A marine propulsion device as set forth in claim 11 and including switching circuit means operative for coupling said regulator and rectifier means to said energy storage means for providing enabling signals to said voltage regulator and rectifier means, and wherein said thermoresponsive means is in circuit between said energy storage means and said voltage regulator and rectifier means for interrupting the flow of enabling signals to said voltage regulator and rectifier means when the ambient temperature exceeds a predetermined value.

16. A marine propulsion device as set forth in claim 15 wherein said thermoresponsive means includes a thermostatic switch in circuit with said switching circuit means for interrupting the flow of enabling signals to said voltage regulator and rectifier means when the ambient temperature exceeds a predetermined value.

* * * * *